(12) United States Patent
Zimmermann et al.

(10) Patent No.: US 8,456,275 B2
(45) Date of Patent: Jun. 4, 2013

(54) ELECTRIC WIRING SYSTEM OF A MOTOR VEHICLE WITH REPLACEABLE CRYPTOGRAPHIC KEY AND/OR CERTIFICATE

(75) Inventors: Sebastian Zimmermann, Munich (DE); Mikhail Smirnov, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 811 days.

(21) Appl. No.: 12/370,071

(22) Filed: Feb. 12, 2009

(65) Prior Publication Data
US 2009/0201139 A1 Aug. 13, 2009

(30) Foreign Application Priority Data
Feb. 13, 2008 (DE) .......... 10 2008 008 970

(51) Int. Cl.
*G05B 19/00* (2006.01)
*G06F 7/00* (2006.01)
*H04B 1/00* (2006.01)
*H04L 9/14* (2006.01)
*H04Q 1/00* (2006.01)

(52) U.S. Cl.
USPC .......... 340/5.2; 340/426.1; 340/988; 340/439

(58) Field of Classification Search
USPC .......... 340/426, 988, 5.2, 439; 455/422, 455/3.01, 3.06, 132; 370/313, 401; 713/151, 713/152, 161
See application file for complete search history.

(56) References Cited

U.S. PATENT DOCUMENTS

| | | | | | |
|---|---|---|---|---|---|
| 5,732,074 | A | * | 3/1998 | Spaur et al. | 370/313 |
| 5,844,473 | A | * | 12/1998 | Kaman | 340/439 |
| 6,028,537 | A | * | 2/2000 | Suman et al. | 340/988 |
| 6,754,183 | B1 | * | 6/2004 | Razavi et al. | 370/254 |
| 6,853,988 | B1 | * | 2/2005 | Dickinson et al. | 705/75 |
| 7,356,304 | B2 | * | 4/2008 | Zoeckler | 455/3.01 |
| 7,366,892 | B2 | * | 4/2008 | Spaur et al. | 713/151 |
| 7,549,046 | B2 | * | 6/2009 | Fehr et al. | 713/168 |
| 7,600,114 | B2 | * | 10/2009 | Reinold et al. | 713/156 |
| 2008/0232595 | A1 | * | 9/2008 | Pietrowicz et al. | 380/277 |
| 2010/0250053 | A1 | * | 9/2010 | Grill et al. | 701/33 |

\* cited by examiner

*Primary Examiner* — Nam V Nguyen
(74) *Attorney, Agent, or Firm* — Crowell & Moring LLP

(57) ABSTRACT

An electric wiring system of a motor vehicle with control devices that communicate with each other via a data bus, and with at least a first communication apparatus inside the vehicle for data exchange with a remote communication station outside the vehicle via a communication channel is provided. To make an authentication of the electric wiring system possible, the first remote communication station outside the vehicle transmits at least one cryptographic key and/or at least one certificate for storage in a first control device of the plurality of control devices via the communication channel to the communication apparatus inside the vehicle. The first control device stores the at least one key and/or the at least one certificate in coded or decoded form and the at least one key and/or the at least one certificate is/are used at least in the framework of an authentication.

20 Claims, 1 Drawing Sheet

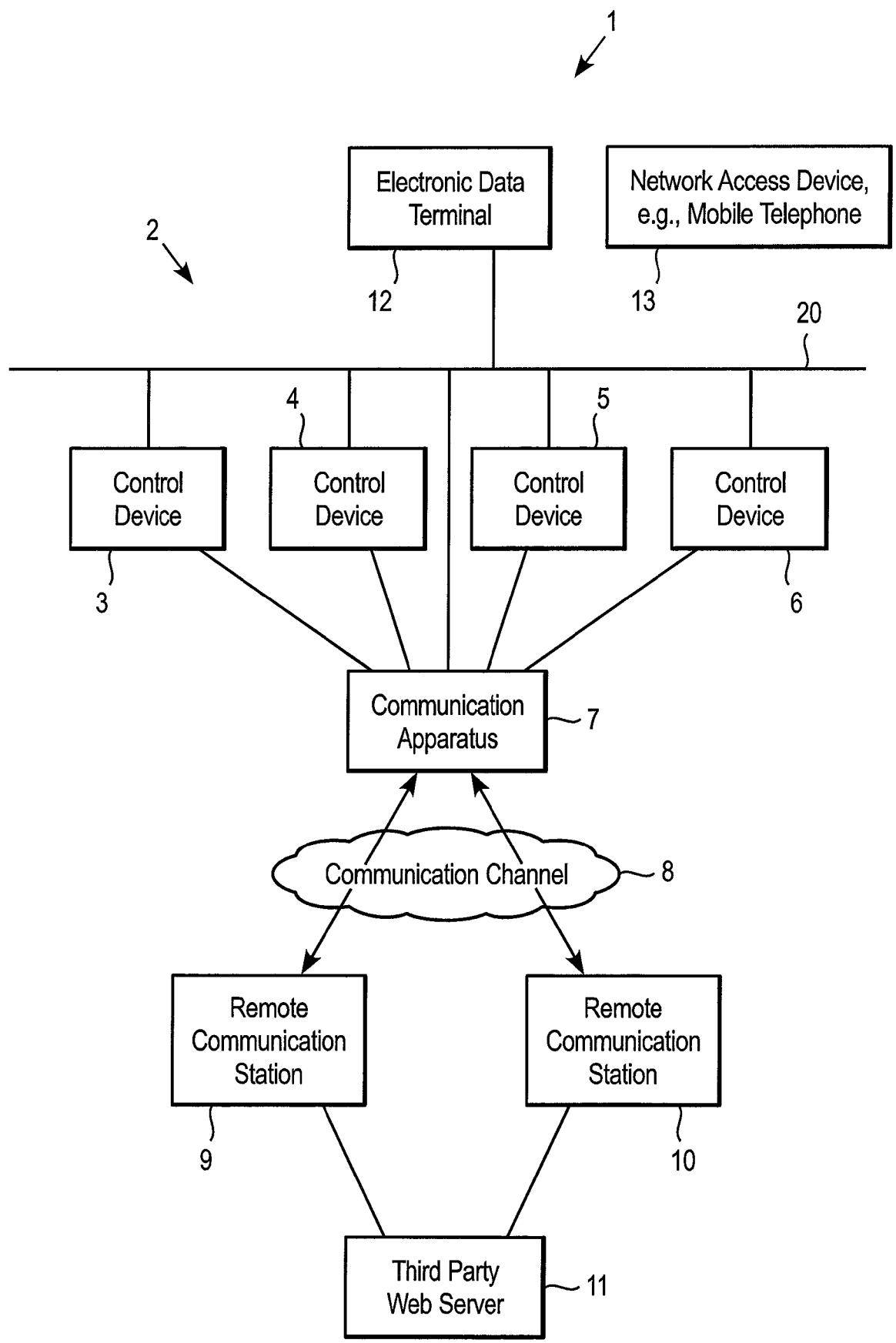

ELECTRIC WIRING SYSTEM OF A MOTOR VEHICLE WITH REPLACEABLE CRYPTOGRAPHIC KEY AND/OR CERTIFICATE

CROSS REFERENCE TO RELATED APPLICATIONS

This application claims priority under 35 U.S.C. §119 to German Patent Application No. 102008008970.2, filed Feb. 13, 2008, the entire disclosure of which is herein expressly incorporated by reference.

BACKGROUND AND SUMMARY OF THE INVENTION

The invention relates to an electric wiring system of a motor vehicle with control devices that communicate with each other via a data bus, and with a communication apparatus inside the vehicle for data exchange with a remote communication station outside the vehicle via a communication channel.

Control devices in vehicles include as a rule a program- and a data memory that are written during production or in the factory with software and data. In a few control devices this data includes an authentication certificate in addition to a cryptographic key that are added by the manufacturer of the control device into the control device in a non-replaceable manner. If the certificate is no longer valid or was recalled, the functionality of the control device can no longer be used to the relevant extent. The control device must be replaced in the workshop by a new control device that has a valid certificate.

The invention solves the problem of creating an electric wiring system of a motor vehicle that can be reliably authenticated relative to at least one remote station.

The invention suggests in the case of the known electric wiring system of a motor vehicle with control devices that communicate with each other via a data bus and with a communication apparatus inside the vehicle for data exchange with at least a first remote communication station outside the vehicle via a communication channel that the first remote communication station outside the vehicle transmits at least one cryptographic key and/or at least one certificate for storage in a first control device of the plurality of control devices via the communication channel to the communication apparatus inside the vehicle. The communication apparatus inside the vehicle communicates with a data bus using data technology and the at least one cryptographic key and/or the at least one certificate is/are supplied to the first control device via the data bus. The first control device stores the at least one key and/or the at least one certificate in coded or decoded form. The at least one key and/or the at least one certificate is/are used at least in the framework of an authentication.

In the authentication a (public) certificate and a corresponding secret cryptographic key are required. The vehicle corroborates with the aid of the secret key that it is really the vehicle. For example, a CE device recognizes with the aid of the certificate that this vehicle is entitled to the communication. As a rule such a certificate contains the public key that fits the private key and contains a signature of the public key by the issuer of the certificate (e.g., the manufacturer of the CE device), as well as features for the validity and entitlement level.

The issuer of the certificate can recall the certificate in that, e.g., an appropriate blocking note is transmitted into the CE devices. The vehicle can then still authenticate but is no longer entitled to use/control the CE device. Inversely, e.g., even the manufacturer of the vehicle can recall certificates, e.g., of CE devices that were entitled to use interfaces to the vehicle.

If required, e.g., when a certificate has expired or been revoked, a new certificate must be installed in the vehicle. In the case of certificate revocation, even the secret key would usually be exchanged in this procedure since the reason for the certificate revocation is as a rule the fact that the previously secret key is no longer secret.

In order to exchange at least one certificate, a cryptographic key, a server address, an http proxy configuration, URLs, telephone numbers for dialing into a data service, e.g., in the first control device for an expired or recalled certificate, a communication connection is established preferably between the vehicle manufacturer (first remote communication station) and the vehicle in question and supplied to the first control device. Then a new authentication can take place with this new certificate.

An embodiment of the invention provides that a data unicate for authentication can be supplied to each first control device and therewith to each vehicle, that is, a one-time certificate individual for the control device or such a cryptographic key.

A further development of the invention provides that a certificate blocking list or a certificate blocking note is supplied to each first control device and therewith to each vehicle. Thus, the vehicle manufacturer can recall a certificate for a second remote communication station outside the vehicle.

Such data unicates (cryptographic keys, certificates, etc.) are used in accordance with the invention especially for processes for digital legal monitoring, for device authentication (remote device authenticates against the vehicle and/or vehicle authenticates against the remote device), for access monitoring in secure communication (client authentication), for browser certificates for server authentication and for other client-related individual data and programs. This makes possible for the driver of the vehicle the inclusion of consumer electronic data terminals in the vehicle and the operation via apparatuses of the vehicle as well as a plurality of new applications in the vehicle. This also makes possible the access of a consumer electronic data terminal to the vehicle's systems such as GPS, speaker, displays, controls, etc., under the control of the vehicle's manufacturer.

An embodiment of the invention provides that the authentication between the first control device and a second remote communication station outside the vehicle takes place, e.g., relative to the Web server of a third party or also relative to the first remote communication station outside the vehicle.

An embodiment of the invention provides that the authentication takes place between the first control device and an electronic data terminal located in the vehicle, in particular, a consumer electronic data terminal.

Another preferred embodiment of the invention provides that the authentication takes place between the first control device and the first remote communication station outside the vehicle.

An embodiment of the invention provides that a coded data exchange takes place via the communication channel, which communication channel is preferably formed by a mobile radio network, in particular a mobile telephone network, or a data network such as LAN or W-LAN.

An embodiment of the invention provides that the communication apparatus inside the vehicle is formed by a network access device inside the vehicle, in particular a mobile telephone built in the vehicle or by such a W-LAN transmitter/ receiver. The "network" is in particular the network of a mobile radio—and/or radio data transmission provider.

A further embodiment of the invention provides that the communication apparatus inside the vehicle is formed by a portable mobile telephone. A portable mobile telephone is a customary mobile telephone that is not built into the vehicle.

An embodiment of the invention provides that the first remote communication station outside the vehicle brings about the transmission and that the at least one key and/or the at least one certificate and/or the certificate revocation list replaces an expired or recalled key and/or an expired or recalled certificate and/or an outdated certificate list in the first control device.

An embodiment of the invention provides that the first control device brings about the transmission and that the at least one key and/or the at least one certificate and/or the certificate revocation list replaces an expired or recalled key and/or an expired or recalled certificate and/or an outdated certificate list in the first control device.

Other objects, advantages and novel features of the present invention will become apparent from the following detailed description of one or more preferred embodiments when considered in conjunction with the accompanying drawings.

BRIEF DESCRIPTION OF THE DRAWINGS

The FIGURE illustrates an exemplary embodiment of an electric wiring system of a motor vehicle, in accordance with the invention.

DETAILED DESCRIPTION OF THE DRAWINGS

The FIGURE illustrates an electric wiring system 2 of a motor vehicle 1 including a plurality of control devices 3, 4, 5 and 6. The electric wiring system also includes a communication apparatus that communicates with a third party server 11 via communication channel 8, which may be a mobile radio network, LAN or W-LAN data network, or the like. The control devices, communication apparatus, and an electronic data terminal 12 can communicate via a data bus 20. The electric wiring system may also have a network access device 13, such as a mobile telephone or the like.

The invention is described in the following using two exemplary embodiments in detail.

The first exemplary embodiment of the invention describes the transmission of a data unicate from a data server outside the vehicle to a control device provided in a vehicle, which data server is provided in a trustworthy environment.

A vehicle with the electric wiring system in accordance with the invention comprises at least one control device provided with individual contents (at least one data unicate). Examples for individual contents are cryptographic keys, certificates or other user-specific or vehicle-specific data, especially for the authentication of the control device relative to a consumer electronic device (CE device) and vice versa.

In a first embodiment of the invention the control device recognizes prior to the transmission at least one (new) data unicate that the individual contents in the control device are no longer valid or no longer sufficient, and that the transmission of a (new) data unicate in the control device is necessary.

In the second embodiment of the invention this is recognized by a data server outside the vehicle that is physically located in a trustworthy environment, in particular with the vehicle manufacturer having sole access, and that serves for the allocation and making available of the individual contents and/or of the data unicates for the control device. The requirement for an additional data unicate can be necessary in particular if additional functions or services, especially after an order, are to be made available to the driver.

The control device with individual contents establishes a secure communication channel via the remote communication station to the server for the allocation and making available of individual contents. Customary processes corresponding to the state of the art, in particular public key processes, can be used for this purpose. A secure communication channel comprises in particular a mutual authentication of the remote stations and a coding of the communication using the relevant security infrastructure.

The control device with individual contents identifies itself to the server via an unambiguous feature, e.g., a name or electric wiring system address, and calls for new, individual data, e.g., a key-certificate pair for a certain use in this control device, for digital legal management (DRM), for a client authentication or for a management of regular certificates.

The server for the allocation and making available of individual contents selects a data set, e.g., a key/certificate pair, from data, programs and other contents or generates it and assigns it in a databank to the inquiring control device so that an individual use can be ensured.

The server for the allocation and making available of individual contents transmits the new individual contents, e.g., the new key/certificate pair, via the secure communication channel, while ensuring the trustworthiness and integrity, to the control device with individual contents.

The control device with individual contents, e.g., keys/ certificate, replaces or supplements the internally stored individual contents with the newly allocated and transmitted individual contents, e.g., key/certificate pairs.

The control device with individual contents transmits the status information of the updating or supplementation, in particular success or failure, to the server for the allocation and making available of individual contents. The latter notes the successful programming in a databank.

The second exemplary embodiment of the invention describes the transmission of a data unicate from a data server outside a vehicle to a control device provided in a vehicle, which data server is provided in a non-trustworthy environment.

In some cases the so-called backend cannot be operated in a trustworthy environment, for example, when the programming should take place by a service organization. The measures cited in the following make even this possible.

The transmission of a data unicate and of updating or supplementary individual contents, e.g., keys, certificates, other user-specific or vehicle-specific data, is started in a first embodiment of the invention by the control device with individual contents when the corresponding requirement has been determined in it, e.g., if the expiration date of the certificate was exceeded. In a second instance the transmission is started by the server for the allocation and making available of individual vehicle-specific or user-specific contents, e.g., certificates, keys, etc. when an updating or supplementation of the individual content of the control device is necessary. This is the case, for example, if a temporary key or a temporary certificate will soon expire, a key or certificate had been recalled or some other reason for an updating or supplementation, e.g., the ordering of new functions or services, had been determined.

The control device with individual contents establishes a communication channel via a remote communication station to the server for the allocation and making available of individual contents. To this end customary processes corresponding to the state of the art such as in particular a public key method can be used.

The control device with individual contents identifies itself to the server via an unambiguous feature, e.g., name or electric wiring system address, and calls for new individual data, e.g., a key/certificate pair for certain usage in this control device, for DRM, for client authentication or for management of regular certificates.

The server for the allocation and making available of individual contents selects a data set, e.g., a key/certificate pair, from data, programs and other contents or generates it and assigns it in a databank to the inquiring control device so that an individual use can be ensured. In this second exemplary embodiment of the invention the data for the inquiring control device is filed coded so that the server for the allocation and making available of individual contents and/or a further server with the coded data can be used in a non-trustworthy environment. A different for coding or a key unicate is preferably used for each control device.

The server for the allocation and making available of individual contents transmits the new individual contents, e.g., the new key/certificate pair, to the control device with individual contents.

The control device with individual contents, e.g., keys/certificates, replaces/supplements the internally stored individual contents with the newly allocated and transmitted individual contents, e.g., key/certificate pairs.

The control device with individual contents, e.g., keys/certificates, transmits the status information of an updating or supplementation, especially success or failure, to the server for the allocation and making available of individual contents. This server notes the successful programming in a databank.

This process is preferably supplemented by a data preparation with which the server is supplied with data, programs and other contents that are filed coded. The server for the allocation of individual contents selects individual data from a server with data, programs and contents and transmits them to a security infrastructure that performs a coding of the data. The coding preferably takes place with an individual cryptographic key associated with the target control device. The previously cited components are preferably operated in a trustworthy environment.

The coded contents are transmitted via a data path, e.g., Internet, DVD shipment, etc., to the server with data, programs and other contents. Since the data is coded, it is no longer necessary to operate the server with data, programs and other contents in a trustworthy environment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric wiring system of a motor vehicle with control devices that communicate with each other via a data bus, and with a communication apparatus inside the vehicle for data exchange with at least one remote communication station outside the vehicle via a communication channel, wherein
a first remote communication station outside the vehicle transmits at least one of a cryptographic key, a certificate, and a certificate revocation list for storage in a first control device of the plurality of control devices via the communication channel to the communication apparatus inside the vehicle,
the communication apparatus inside the vehicle communicates with a data bus using data technology and the at least one of the cryptographic key, the certificate and the certificate revocation list is supplied to the first control device via the data bus,
the first control device stores the at least one of the cryptographic key, the certificate and the certificate revocation list in coded or decoded form,
the at least one of the cryptographic key, the certificate and the certificate revocation list is used at least in the framework of an authentication, and
the authentication between the first control device and a second remote communication station outside the vehicle takes place relative to a Web server of a third party, the vehicle authenticates itself with a first key/certificate combination of a first cryptographic key and a first certificate to the second remote communication station outside the vehicle, and the second remote communication station outside the vehicle authenticates itself to the vehicle with a second key/certificate combination of a second cryptographic key and a second certificate.

2. The electric wiring system according to claim 1, wherein a data unicate is supplied to the first control device and therewith to the vehicle for authentication.

3. The electric wiring system according to claim 2, wherein the data unicate is generated especially for the first control device concerned before the transmission into the vehicle at the first remote communication station outside the vehicle.

4. The electric wiring system according to claim 1, wherein the authentication takes place between the first control device and an electronic data terminal located in the vehicle.

5. The electric wiring system according to claim 1, wherein the authentication takes place between the first control device and the first remote communication station outside the vehicle.

6. The electric wiring system according to claim 1, wherein a coded data exchange takes place via the communication channel, which communication channel is formed by a mobile telephone network or a LAN or W-LAN data network.

7. The electric wiring system according to claim 1, wherein the communication apparatus inside the vehicle is formed by a mobile telephone built in the vehicle or a W-LAN transmitter/receiver.

8. The electric wiring system according to claim 1, wherein the communication apparatus inside the vehicle is formed by a mobile telephone that can be carried out of the vehicle.

9. The electric wiring system according to claim 1, wherein the first remote communication station outside the vehicle brings about the transmission and at least one of the cryptographic key, the certificate and the certificate revocation list replaces at least one of an expired or recalled key, an expired or recalled certificate and an outdated certificate revocation list in the first control device.

10. The electric wiring system according to claim 1, wherein the first control device brings about the transmission and at least one of the cryptographic key, the certificate and the certificate revocation list replaces at least one of an expired or recalled key, an expired or recalled certificate and an outdated certificate revocation list in the first control device.

11. A method for data exchange between control devices in an electric wiring system of a motor vehicle that communicate with each other, and with a communication apparatus inside the vehicle, via a data bus and at least one remote communication station outside the vehicle via a communication channel, the method comprising the acts of:
receiving, in the communication apparatus, at least one of a cryptographic key, a certificate and a certificate revocation list for storage in a first control device;

transmitting, via the data bus, the at least one of the cryptographic key, the certificate and the certificate revocation list to the first control device;

storing the at least one of the cryptographic key, the certificate and the certificate revocation list in coded or decoded form; and establishing a framework of an authentication based on the at least one of the cryptographic key, the certificate and the certificate revocation list, wherein the authentication between the first control device and a second remote communication station outside the vehicle takes place relative to a Web server of a third party, the vehicle authenticates itself with a first key/certificate combination of a first cryptographic key and a first certificate to the second remote communication station outside the vehicle, and the second remote communication station outside the vehicle authenticates itself to the vehicle with a second key/certificate combination of a second cryptographic key and a second certificate.

12. The method according to claim 11, wherein a data unicate is supplied to the first control device and therewith to the vehicle for authentication.

13. The method according to claim 12, wherein the data unicate is generated especially for the first control device concerned before the transmission into the vehicle at the first remote communication station outside the vehicle.

14. The method according to claim 11, wherein the authentication takes place between the first control device and an electronic data terminal located in the vehicle.

15. The method according to claim 11, wherein the authentication takes place between the first control device and the first remote communication station outside the vehicle.

16. The method according to claim 11, wherein a coded data exchange takes place via the communication channel, which communication channel is formed by a mobile telephone network or a LAN or W-LAN data network.

17. The method according to claim 11, wherein the first remote communication station outside the vehicle brings about the transmission and at least one of the cryptographic key, the certificate and the certificate revocation list replaces at least one of an expired or recalled key, an expired or recalled certificate and an outdated certificate revocation list in the first control device.

18. The method according to claim 11, wherein the first control device brings about the transmission and at least one of the cryptographic key, the certificate and the certificate revocation list replaces at least one of an expired or recalled key, an expired or recalled certificate and an outdated certificate revocation list in the first control device.

19. The method according to claim 11, wherein a consumer electronic data terminal requests access to a vehicle system and the access is granted by the electric wiring system of the motor vehicle by validating an authentication of the consumer electronic data terminal using the cryptographic key and the certificate.

20. The method according to claim 19, wherein the access is revoked by updating the certificate revocation list in the first control device.

* * * * *